United States Patent
Pare, Jr. et al.

(10) Patent No.: US 6,269,348 B1
(45) Date of Patent: *Jul. 31, 2001

(54) TOKENLESS BIOMETRIC ELECTRONIC DEBIT AND CREDIT TRANSACTIONS

(75) Inventors: David Ferrin Pare, Jr.; Ned Hoffman; Jonathan Alexander Lee, all of Berkeley, CA (US)

(73) Assignee: Veristar Corporation, Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/239,570

(22) Filed: Jan. 29, 1999

Related U.S. Application Data

(63) Continuation of application No. 08/705,399, filed on Aug. 29, 1996, now Pat. No. 5,870,723, which is a continuation-in-part of application No. 08/442,895, filed on May 17, 1995, now Pat. No. 5,613,012, which is a continuation-in-part of application No. 08/345,523, filed on Nov. 28, 1994, now Pat. No. 5,615,277.

(51) Int. Cl.[7] .................................................. G06F 17/60
(52) U.S. Cl. ............................ 705/39; 705/35; 705/42; 705/44; 705/18; 705/53; 705/64; 705/67; 705/76; 705/78
(58) Field of Search ............................ 705/39, 18, 26, 705/41, 44, 43, 35, 50, 53, 64, 67, 72, 76, 78, 79; 380/24, 23, 25; 382/115; 902/3, 5, 20, 24, 40

(56) References Cited

U.S. PATENT DOCUMENTS

| | | | |
|---|---|---|---|
| 4,321,672 | 3/1982 | Braun | 364/408 |
| 4,390,968 | 6/1983 | Hennessy | 364/900 |
| 4,675,815 | 6/1987 | Kuroki | 379/37 |

(List continued on next page.)

FOREIGN PATENT DOCUMENTS

| | | | |
|---|---|---|---|
| 0 823 701 A2 | * 2/1998 | (EP) | |
| WO95/13591 | 5/1995 | (WO) | |
| WO 98/50875 | * 11/1998 | (WO) | |

OTHER PUBLICATIONS

EPO Application 0651357A1, Transaction Processing System Published May 3, 1995—Holloway.

(List continued on next page.)

*Primary Examiner*—Edward R. Cosimano
*Assistant Examiner*—John W. Hayes
(74) *Attorney, Agent, or Firm*—Ali Kamarei

(57) ABSTRACT

The invention satisfies these needs by providing a method and device for tokenless authorization of an electronic payment between a payor and a payee using an electronic third party identicator and at least one payor bid biometric sample. The method comprises a payor registration step, wherein the payor registers with an electronic third party identicator at least one registration biometric sample, and at least one payor credit/debit account. The payee registers a payee identification data with the electronic third party identicator. An electronic financial transaction is formed between the payor and the payee, comprising payee bid identification data, a transaction amount, and at least one payor bid biometric sample, wherein the bid biometric sample is obtained from the payor's person, in a transaction formation step. The payee bid identification data, the transaction amount, and payor bid biometric sample are electronically forwarded to the third party electronic identicator. A comparator engine compares the bid biometric sample with at least one registered biometric sample for producing either a successful or failed identification of the payor. The comparator engine also compares the payee's bid identification data with a payee's registered identification data for producing either a successful or failed identification of the payee. Once the device successfully identifies the payor and payee, a biometric-based authorization of an electronic payment is issued without the payor presenting any personalized man-made tokens such as magnetic swipe cards or smartcards to transfer funds from the payor's financial credit/debit account to the payee's financial account.

28 Claims, 5 Drawing Sheets

U.S. PATENT DOCUMENTS

| | | | |
|---|---|---|---|
| 4,747,050 | * 5/1988 | Brachtl et al. | 705/18 |
| 4,799,156 | 1/1989 | Shavit | 364/401 |
| 4,821,118 | * 4/1989 | Lafreniere | 382/116 |
| 4,837,422 | 6/1989 | Dethloff et al. | 364/408 |
| 4,926,480 | 5/1990 | Chaum | 380/23 |
| 4,961,142 | 10/1990 | Elliott et al. | 364/408 |
| 4,993,068 | * 2/1991 | Piosenka et al. | 383/23 |
| 4,995,086 | * 2/1991 | Lilley et al. | 382/124 |
| 4,998,279 | 3/1991 | Weiss | 340/825 |
| 5,036,461 | * 7/1991 | Elliott et al. | 705/41 |
| 5,054,089 | * 10/1991 | Uchida et al. | 382/127 |
| 5,095,194 | * 3/1992 | Barbanell | 382/124 |
| 5,109,427 | * 4/1992 | Yang | 382/127 |
| 5,109,428 | 4/1992 | Igaki et al. | 382/5 |
| 5,144,680 | * 9/1992 | Kobayashi et al. | 382/124 |
| 5,146,102 | 9/1992 | Higuchi et al. | 250/556 |
| 5,168,520 | 12/1992 | Weiss | 380/23 |
| 5,180,901 | * 1/1993 | Hiramatsu | 235/380 |
| 5,191,611 | 3/1993 | Lang | 380/25 |
| 5,210,588 | 5/1993 | Lee | 381/2 |
| 5,210,797 | 5/1993 | Usui et al. | 382/4 |
| 5,222,152 | 6/1993 | Fishbine et al. | 382/2 |
| 5,224,164 | 6/1993 | Eisner et al. | 380/44 |
| 5,229,764 | 7/1993 | Matchett et al. | 340/825 |
| 5,230,025 | 7/1993 | Fisfbine et al. | 382/4 |
| 5,239,583 | 8/1993 | Parrillo | 380/23 |
| 5,241,606 | * 8/1993 | Horie | 382/126 |
| 5,251,259 | 10/1993 | Mosley | 380/23 |
| 5,265,162 | 11/1993 | Bush et al. | 380/24 |
| 5,276,314 | 1/1994 | Martino et al. | 235/380 |
| 5,280,527 | * 1/1994 | Gullman et al. | 380/23 |
| 5,321,242 | 6/1994 | Heath, Jr. | 235/382 |
| 5,325,442 | 6/1994 | Knapp | 382/4 |
| 5,335,288 | * 8/1994 | Faulkner | 382/115 |
| 5,343,529 | 8/1994 | Goldfine et al. | 380/23 |
| 5,351,303 | * 9/1994 | Willmore | 382/115 |
| 5,354,974 | 10/1994 | Eisenberg | 235/379 |
| 5,359,669 | * 10/1994 | Shanley et al. | 382/117 |
| 5,386,104 | * 1/1995 | Sime | 902/3 |
| 5,499,288 | 3/1996 | Hunt | 379/88 |
| 5,561,718 | 10/1996 | Trew et al. | 379/266 |
| 5,604,802 | 2/1997 | Holloway | 380/24 |
| 5,613,102 | 3/1997 | Hoffman et al. | 382/115 |
| 5,615,277 | 3/1997 | Hoffman | 382/115 |
| 5,636,282 | 6/1997 | Holmquist | 380/25 |
| 5,745,555 | 4/1998 | Mark | 379/95 |
| 5,757,917 | * 5/1998 | Rose et al. | 705/26 |
| 5,764,789 | 6/1998 | Pare, Jr. et al. | 382/115 |
| 5,790,668 | * 8/1998 | Tomko | 380/25 |
| 5,802,199 | 9/1998 | Pare, Jr. et al. | 382/115 |
| 5,805,719 | 9/1998 | Pare, Jr. et al. | 382/115 |
| 5,822,737 | * 10/1998 | Ogram | 705/26 |
| 5,826,241 | * 10/1998 | Stein et al. | 705/26 |
| 5,826,245 | 10/1998 | Sandberg-Diment | 705/44 |
| 5,838,812 | 10/1998 | Pare, Jr. et al. | 705/44 |
| 5,848,400 | * 12/1998 | Chang | 705/35 |
| 5,870,723 | * 2/1999 | Pare, Jr. et al. | 705/39 |
| 5,930,804 | * 7/1999 | Yu et al. | 707/104 |
| 6,016,476 | * 1/2000 | Maes et al. | 705/26 |
| 6,023,688 | * 2/2000 | Ramachandran et al. | 705/44 |
| 6,040,783 | * 3/2000 | Houvener | 382/115 |
| 6,105,010 | * 8/2000 | Musgrave | 705/44 |

OTHER PUBLICATIONS

EPO Application 0581421 A1, Method and System for Certificate Based Alias Detection Published Feb. 2, 1994—Gajnak.

PCT Publication WO 98/25227, Biometric Security Encryption System Hamid.

American Society for Industrial Security, Security Management, V. 37, n11 (Nov. 1993): 17–19 Anderson et al.

When Data Warehouse become Open House, D. Radcliff Software Management, v16 n11 Nov. 26, 1996.

A Credit Union Points a Finger at Biometrics, Anonymous Bank Network News, v15 n16 Jan. 13, 1997.

Scanning Lets Fingerprints do talking, J. Hall Toronto Star, PA6 May 15, 1997.

CompUSA Tests Fingerprints to Help Secure Transactions, R. Scally Discount Store News v36 n10 May 19, 1997.

* cited by examiner

TOKENLESS BIOMETRIC ELECTRONIC DEBIT AND CREDIT TRANSACTIONS

CROSS REFERENCE

This application is a continuation-in-part of application Ser. No. 09/183,215, filed Oct. 30, 1998 and a continuation-in-part of application Ser. No. 08/705,399, filed on Aug. 29, 1996 now U.S. Pat. No. 5,870,723, which is a continuation-in-part of U.S. application Ser. No. 08/442,895 filed on May 17, 1995 now U.S. Pat. No. 5,613,012 which is a continuation-in-part of U.S. application Ser. No. 08/345,523, filed on Nov. 28, 1994, now U.S. Pat. No. 5,615,277.

FIELD OF THE INVENTION

This invention relates to the field of tokenless biometric financial transactions. Specifically, this invention is directed towards a system and method of using biometrics for processing electronic financial transactions such as on-line debit, off-line debit and credit without requiring the user to directly use or possess any man-made propriety tokens. For any transaction designated to be processed as an electronic credit or debit, this invention provides a user, whether an individual or a business, with the ability to pay for goods and services either at the retail point of sale ("POS"), at an automated teller machine ("ATM") or over the internet using only a biometric.

BACKGROUND

The use of a token, an inanimate object which confers a capability to the buyer presenting it, is pervasive in today's electronic financial world. Whether a consumer is buying groceries with a debit card or shopping in a department store with a credit card, at the heart of that transaction is a money transfer enabled by a token, which acts to identify both the consumer as well as the financial account being accessed.

Traditionally, a person must directly possess a man-made personalized token whenever attempting authorization for an electronic financial transaction. Tokens such as magnetic ink encoded paper checks, smart cards, magnetic swipe cards, identification cards or even a personal computer programmed with resident user-specific account data, are "personalized" because they are each programmed or encoded with data that is unique and personalized to the authorized user. For examples: at a retail point of sale, the user directly possesses and physically presents personalized credit or debit cards encoded with his unique account data to the merchant; or, over the internet, the user directly possesses and electronically presents his personal computer's resident user-unique account data to the remote merchant. By contrast, as the disclosed invention is completely tokenless, it does not require the user to directly possess, carry or remember any personalized token that can be lost, stolen or damaged.

The sole functions of such tokens are to attempt to identify both the user and the financial account being accessed to pay for the transaction. However, these tokens can be easily exchanged, either knowingly or unknowingly, between users, thereby de-coupling them from the original intended user. Because these encoded credit or debit cards, identification cards or personal computers storing resident user data are ubiquitous in today's consumer and business transactions as verification of the submitter's check writing authority, and the attendant inconveniences and security vulnerabilities of such tokens are widespread.

Credit cards can easily be turned into cash if the card falls into the wrong hands. While theft of a token constitutes the majority of fraud in the system, fraud from counterfeit credit cards is rising rapidly. Counterfeit credit cards are manufactured by a more technically sophisticated criminal who acquires a cardholder's valid account number, produces a valid-looking counterfeit card, encodes the magnetic strip, and embosses the counterfeit plastic card with the account number. The card is then repeatedly presented to merchants until the account's credit limit is reached. Another form of loss is caused by a criminal seller or his employees who surreptitiously obtains the cardholder's account number and enter fictitious transactions against the card and then take cash out of the till. It is estimated that losses due to all types of fraud exceeds one billion dollars annually.

Generally, debit cards are used in conjunction with a personal identification number (PIN). However, various strategies have been used to obtain PINs from unwary cardholders; these range from Trojan horse automated teller machines in shopping malls that dispense cash but record the PIN, to fraudulent seller point of sale devices that also record the PIN, to criminals with binoculars that watch cardholders enter PINs at ATMs. The subsequently manufactured counterfeit debit cards are then used in various ATM machines until the unlucky account is emptied.

Customer fraud, for both credit and debit cards, is also on the rise. Customers intent on this sort of fraud will claim that they lost their card, say that their PIN was written on the card, and then withdraw money from their account using card, and then refuse to be responsible for the loss.

The financial industry is well aware of the trends in fraud, and is constantly taking steps to improve the security of the card. However, the linkage between the buyer and his token is tenuous, and that is the fundamental reason behind card fraud today.

One possible solution to stolen-card fraud involves placing PIN protection for magnetic stripe credit cards, much as debit cards have PINs today. This will raise the administrative costs for each card, since cardholders will undoubtedly wish to select their own PIN for each of their 3.4 cards (the national average). In addition, this solution still doesn't address the problem of counterfeit cards.

Another solution that solves both stolen-card fraud and greatly reduces counterfeit-card fraud involves using a smartcard that includes either a biometric or a PIN. In this approach, authenticated biometrics are recorded from a user of known identity and stored for future reference on a token. In every subsequent access attempt, the user is required to physically enter the requested biometric, which is then compared to the authenticated biometric on the token to determine if the two match in order to verify user identity.

Various token-based biometric technologies have been suggested in the prior art, using smart cards, magnetic swipe cards, or paper checks in conjunction with fingerprints, hand prints, voice prints, retinal images, facial scans or handwriting samples. However, because the biometrics are generally either: a) stored in electronic and reproducible form on the token itself, whereby a significant risk of fraud still exists because the comparison and verification process is not isolated from the hardware and software directly used by the payor attempting access, or; b) used in tandem with the user directly using magnetic swipe cards, paper checks or a PC with the user's financial data stored resident therein. Examples of this approach to system security are described in U.S. Pat. No. 4,821,118 to Lafreniere; U.S. Pat. No. 4,993,068 to Piosenka et al.; U.S. Pat. No. 4,995,086 to Lilley et al.; U.S. Pat. No. 5,054,089 to Uchida et al.; U.S. Pat. No. 5,095,194 to Barbanell; U.S. Pat. No. 5,109,427 to Yang; U.S. Pat. No. 5,109,428 to Igaki et al.; U.S. Pat. 5,144,680 to Kobayashi et al.; U.S. Pat. No. 5,146,102 to Higuchi et al.; U.S. Pat. No. 5,180,901 to Hiramatsu; U.S. Pat. No. 5,210,588 to Lee; U.S. Pat. No. 5,210,797 to Usui et al.; U.S. Pat. No. 5,222,152 to Fishbine et al.; U.S. Pat. No. 5,230,025 to Fishbine et al.; U.S. Pat. No. 5,241,606 to Horie; U.S. Pat. No. 5,265,162 to Bush et al.; U.S. Pat. No. 5,321,242 to Heath, Jr.; U.S. Pat. No. 5,325,442 to Knapp; U.S. Pat. No. 5,351,303 to Willmore, all of which are incorporated herein by reference.

Uniformly, the above patents disclose financial systems that require the user's presentation of personalized tokens to authorize each transaction, thereby teaching away from tokenless biometric financial transactions. To date, the consumer financial transaction industry has had a simple equation to balance: in order to reduce fraud, the cost and complexity of the personalized token directly possessed by the user must increase.

Also, the above patents that disclose commercial transaction systems teach away from biometric recognition without the use of tokens or PINs. Reasons cited for such teachings range from storage requirements for biometric recognition systems to significant time lapses in identification of a large number of individuals, even for the most powerful computers.

Unfortunately, any smartcard-based system will cost significantly more than the current magnetic stripe card systems currently in place. A PIN smartcard costs perhaps $3, and a biometric smartcard will cost $5. In addition, each point of sale station would need a smartcard reader, and if biometrics are required, a biometric scanner will also have to be attached to the reader as well. With 120 million cardholders and 5 million stations, the initial conversion cost is from two to five times greater than the current annual fraud losses.

This large price tag has forced the industry to look for new ways of using the power in the smartcard in addition to simple commercial transaction. It is envisioned that in addition to storing credit and debit account numbers and biometric or PIN authentication information, smart cards may also store phone numbers, frequent flyer miles, coupons obtained from stores, a transaction history, electronic cash usable at tollbooths and on public transit systems, as well as the buyer's name, vital statistics, and perhaps even medical records.

The net result of "smartening" the token is centralization of function. This looks good during design, but in actual use results in increased vulnerability for the consumer. Given the number of functions that the smartcard will be performing, the loss or damage of this monster card will be excruciatingly inconvenient for the cardholder. Being without such a card will financially incapacitate the cardholder until it is replaced. Additionally, losing a card full of electronic cash will also result in a real financial loss as well.

Thus, after spending vast sums of money, the resulting system will definitely be more secure, but will result in heavier and heavier penalties on the consumer for destruction or loss of the card.

To date, the consumer financial transaction industry has had a simple equation to balance: in order to reduce fraud, the cost of the card must increase. As a result, there has long been a need for an electronic financial transaction system that is highly fraud-resistant, practical, convenient for the consumer, and yet cost-effective to deploy.

As a result, there is a need for a new electronic financial transactions system that is highly fraud-resistant, practical, convenient for the consumer, and yet cost-effective to deploy. More specifically, there is a need for an electronic check financial transaction system that relies solely on a payor's biometric for transaction authorization, and does not require the payor to directly possess any personalized man-made memory tokens such as smart cards, magnetic swipe cards, encoded paper checks or personal computers for identification.

Lastly, such a system must be affordable and flexible enough to be operatively compatible with existing networks having a variety of electronic transaction devices and system configurations. Accordingly, it is the objective of the present invention to provide a new system and method of tokenless biometric financial transactions for electronic checks.

There is also a need for an electronic financial transaction system that uses a strong link to the person being identified, as opposed to merely verifying a buyer's possession of any physical objects that can be freely transferred. This will result in a dramatic decrease in fraud, as only the buyer can authorize a transaction.

Accordingly, it is the objective of the present invention to provide a new system and method of tokenless biometric financial transactions for electronic credit and debit.

Another objective of the invention is to provide an electronic credit and debit financial transaction system and method that eliminates the need for a payor to directly possess any personalized man-made token which is encoded or programmed with data personal to or customized for a single authorized user. Further, it is an objective of the invention to provide an electronic financial transaction system that is capable of verifying a user's identity based on one or more unique characteristics physically personal to the user, as opposed to verifying mere possession of personalized objectives and information.

Another objective of the invention is to provide an electronic financial transaction system that is practical, convenient, and easy to use, where payors no longer need to remember personal identification numbers to access their financial accounts.

Another objective of the invention is to provide increased security in a very cost-effective manner, by completely eliminating the need for the payor to directly use ever more complicated and expensive personalized tokens.

Another objective of the invention is to provide an electronic financial transaction system that is highly resistant to fraudulent access attempts by unauthorized users.

Another objective of the invention is to authenticate the system to the payor once the electronic financial transaction is complete, so the payor can detect any attempt by criminals to steal their authentication information.

Another objective of the invention is that the payee be identified by an electronic third party identicator, wherein the payee's identification is verified. Therefore, the payee would register with the electronic third party identicator payee identification data, which optionally comprises, a payee hardware ID code, a payee phone number, a payee email address, a payee digital certificate code, a payee financial account number, a payee biometric, or a payee biometric and PIN combination.

Still, another objective of the invention is to be added in a simple and cost-effective manner to existing terminals currently installed at points of sale and used over the Internet around the world.

Yet another objective of the invention is to be efficiently and effectively operative with existing financial transactions systems and protocols, specifically as these systems and protocols pertain to processing of electronic credit and debits.

SUMMARY

The invention satisfies these needs by providing a method and device for tokenless authorization of an electronic payment between a payor and a payee using an electronic third party identicator and at least one payor bid biometric sample. The method comprises a payor registration step, wherein the payor registers with an electronic third party identicator at least one registration biometric sample, and at least one payor credit/debit account. In a payee registration step, the payee registers a payee identification data with the electronic third party identicator. An electronic financial transaction is formed between the payor and the payee, comprising payee bid identification data, a transaction amount, and at least one payor bid biometric sample, wherein the bid biometric sample is obtained from the payor's person, in a transaction formation step. Preferably in one transmission step the payee bid identification data, the transaction amount, and payor bid biometric sample are electronically forwarded to the third party electronic identicator. A comparator engine or the identification module of the third party identiticator compares the bid biometric sample with at least one registered biometric sample for producing either a successful or failed identification of the payor. The comparator engine also compares the payee's bid identification data with a payee's registered identification data for producing either a successful or failed identification of the payee. Once the third party identicator successfully identifies the payor and payee, a biometric-based authorization of an electronic payment is issued without the payor presenting any personalized man-made tokens such as magnetic swipe cards or smartcards to transfer funds from the payor's financial credit/debit account to the payee's financial account.

The payee identification data comprises any one of the following; a payee hardware ID code, a payee telephone number, a payee email address, a payee digital certificate code, a payee account index, a payee financial account number, a payee biometric, and a payee biometric and PIN combination.

The payee registration step further comprises registering a payee biometric sample with the electronic third party identicator, which is compared in the payee identification step with at least one registered biometric sample for identification of the payee. The payor registration step further comprises registering a payor personal identification number with the electronic third party identicator, which is used by the tokenless authorization system to identify the payor.

The authorization system alternatively further comprising a payor resource determination step, wherein it is determined if the payor's financial account has sufficient resources to be debited for the transaction amount.

Optionally, in a payor account selection step, after the payor has been successfully identified in the payor identification step, the tokenless authorization system presents at least one financial account which was registered by the payor with the tokenless authorization system for selection of one of the credit/debit accounts by the payor for debiting. In a transaction payment step, the transaction amount is debited from a payor's financial account. Preferably, at the same time, the transaction amount is credited to the payee's financial account.

The present invention is significantly advantageous over the prior art in a number of ways. First, it is extremely easy and efficient for people to use because it eliminates the need to directly possess any personalized tokens in order to access their authorized electronic financial accounts.

The present invention eliminates all the inconveniences associated with carrying, safeguarding, and locating such tokens, thereby significantly reduces the amount of memorization and diligence increasingly traditionally required of people by providing protection and access to all financial accounts using only a biometric. The buyer is now uniquely empowered, by means of this invention, to conveniently conduct his personal and/or professional electronic transactions at any time without dependence upon tokens which may be stolen, lost or damaged.

The invention is clearly advantageous from a convenience standpoint to sellers and financial institutions by making electronic credit and debit purchases and other financial transactions less cumbersome and more spontaneous. The paperwork of financial transactions is significantly reduced as compared to standard credit and debit transactions wherein the copies of the signed receipt must often be retained by the seller, financial institutions and the buyer.

Overall, because the method and system of this invention is designed to provide a person with simultaneous direct access to all of his financial accounts, the need for transactions involving credit cards, debit cards, paper money, credit drafts and the like will be greatly reduced, thereby reducing the cost of equipment and staff required to collect, account, and process such transactions.

Further, the substantial manufacturing and distributing costs of issuing and reissuing all personalized tokens such as magnetic swipe cards and smart cards, thereby providing further economic savings to issuing banks, businesses, and ultimately to consumers.

Even the traditional requirement for internet electronic transactions of the buyer needing to directly possess and use the ultimate personalized token, a personal computer with resident buyer-specific data, will be eliminated.

Moreover, the invention is markedly advantageous and superior to existing systems in being highly fraud resistant. As discussed above, present authorization systems are inherently unreliable because they base determination of a user's identity on the physical presentation of a manufactured personalized token along with, in some cases, information that the user knows. Unfortunately, both the token and information can be transferred to another person through loss, theft or by voluntary action of the authorized user.

Thus, unless the loss or unintended transfer of these items is realized and reported by the authorized user, anyone possessing such items can be recognized by existing authorization systems as the buyer to whom that token and its corresponding financial accounts are assigned. Even appending the need for presentation of a biometric in conjunction with such personalized tokens is severely flawed, since if the authorized buyer is unable to present the requisite token at the time of transaction, he will be unable to access his financial accounts. As such, these complex arrangements are ineffective, since the security they intend to provide can easily block an authorized user from using his own rightful financial resources by virtue of his personalized token having been lost, stolen or damaged.

By contrast, the present invention virtually eliminates the risk of denying access to rightful users while simultaneously protecting against granting access to unauthorized users. By determining identity and transaction authorization solely from an analysis of a user's unique biometric characteristics, this invention creates a highly secure system that maintains optimal convenience for both buyers and sellers to transaction their electronic business anytime, anywhere.

These and other advantages of the invention will become more fully apparent when the following detailed description of the invention is read in conjunction with the accompanying drawings.

DETAILED DESCRIPTION

The invention provides a careless biometric method for authorizing electronic payments using, credit and debit accounts either at the retail point of sale or over the Internet. It is the essence of this invention that the payor not be required to directly use any man-made personalized token in order to effect the transaction. A computer system is used to accomplish these goals.

A credit account is defined as an account that allows authorization and settlement of electronic payments as issued by such entities as VISA®, MasterCard®, Discover®, American Express®, or an in-house credit account issued by a retailer such as Macy's. Issuers of credit accounts lend money to payors, often charge interchange fees to payees, and are responsible for approving or denying transactions. Off-line debit accounts are also defined as credit accounts even though the funds are deposited by a payor instead of a line of credit from an issuer.

A debit account is defined as an account that holds money deposited by a payor available for immediate debit in real time, also known in the industry as on-line debit. These are often checking accounts. On-line debit transactions require a PIN for identification of the payor.

The tokenless authorization system or the third party identicator comprises the following components:
Party Identification Apparatus (PIA)
Communication lines
Data Processing Center (DPC)

These components together allow a payor to originate an electronic payment without requiring the payor to carry driver's licenses, credit cards, check guarantee cards, or other forms of identity.

Party Identification Apparatus (PIA)

Figure 1:
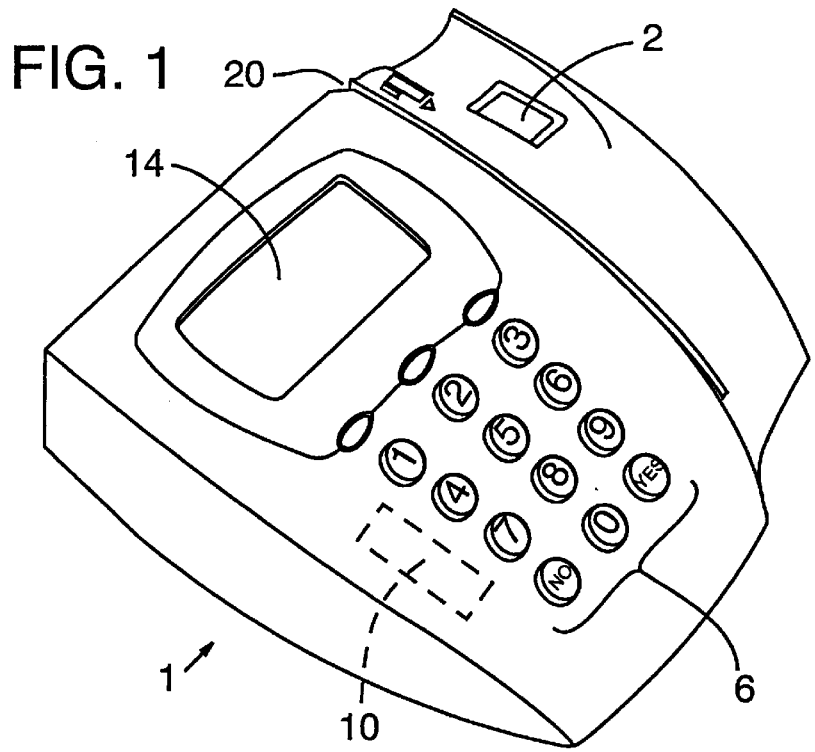
FIG. 1 shows the preferred embodiment of a Party Identification Apparatus (PIA) with a biometric sensor and key pad.

The PIA is a device that gathers identity information for use in authorizing electronic payments. Each PIA conducts one or more of the following operations:
gather biometric input from a payor or payee
gather a PIN code or password from a payor or payee
secure communication between PIA and DPC using encryption
secure storage of secret encryption keys
store and retrieve a unique payee PIA hardware identification code
secure enclosure & components from unauthorized tampering
display information, allow parties to approve or cancel an electronic payment
scan a magnetic stripe card
store, verify, and retrieve a payee digital identification code
allow parties to select among choices of payor and payee credit/debit accounts A preferred embodiment containing these components is shown in FIG. 1.

Biometric input is gathered using a biometric sensor 2 located within the PIA 1. Biometric sensor 2 is a finger image sensor, however it is understood that other types of biometric sensors such as iris scan and others are also used.

For PIAs requiring a fingerprint sensor, the PIA has a biometric fraud detection unit (not shown) that will assure that any biometric input gathered from the biometric sensor is from a real physical person, instead of a copy or replica. Preferably for the finger image sensor, this is a blood flow detector.

For systems employing a PIN, PIN input is preferably gathered using a keypad or PIN pad 6 that is also located securely inside the PIA.

Communication security is provided by encryption using unique secret keys known only to that specific PIA and the DPC, and the DES encryption algorithm, preferably triple-encrypted. Triple encryption means successive encrypt/decrypt/encrypt operations using two distinct 56-bit DES keys. This provides significantly higher security than a single encryption operation with one 56-bit DES key. Alternately, a public/private key system may also be used to encrypt information that passes between PIA and DPC. Both DES and public key encryption is well known in the industry.

The PIA also has secure memory that can store and retrieve the unique secret encryption keys used to enable secure communications with the DPC. In this embodiment, this is battery backed-up RAM that is set up to be erased whenever the tamper-detect circuitry reports that tampering has been detected.

To use encryption keys, a key management system must be employed to assure that both sender and receiver are using the same key. When using DES, a preferred key management system is DUKPT, which is well known in the industry. DUKPT is designed to provide a different DES key for each transaction, without leaving behind the trace of the initial secret key. The implications of this are that even successful capture and dissection of a PIA will not reveal messages that have previously been sent, a very important goal when the effective lifetime of the information transmitted is years. DUKPT is fully specified in ANSI X9.24.The DUKPT key table is stored in the secure memory.

Each PIA preferably has a hardware identification code that is registered with the DPC at the time of manufacture. This makes the PIA uniquely identifiable to the DPC in all transmissions from that device. This hardware identification code is stored in write-once memory 10.

PIA physical security is assured by standard mechanisms. Preferably, these comprise tamper-detect circuitry, an enclosure that cannot be easily opened without visibly injuring the enclosure, erasable memory for critical secrets such as encryption keys, write-once memory for hardware identification, tight integration of all components, and "potting" of exposed circuitry.

Information such as the amount of a transaction, the identity of a payee, the list of credit/debit accounts for a payor to select from, or other transaction-related information is displayed using an integrated LCD screen 14. It is preferable that the LCD screen be connected securely to the other components in the PIA to maintain security.

Approval or cancellation of an electronic payment is done using the PIA keypad.

The magnetic stripe reader 20 is used to read the account information that is encoded on the magnetic stripe of a credit or debit card. This is used during initial registration to link a payor's credit/debit account number to the biometric identity.

Optionally, the PIA also validates public key digital certificates. In one embodiment, public keys of a particular certifying authority are initially stored in the PIA at the time of construction. This provides the mechanism to verify a payee's digital certificates that are signed by the certifying authority.

The PIA also optionally displays a list of payor credit/debit or payee financial accounts on the LCD screen and provides for selection of accounts using the keypad. Specific logos provided by each card issuer are preferably displayed in place of the account number, so that the payor can select which credit/debit account the electronic payment will come from using the keypad.

Although a preferred embodiment is described above, there are many different variations on specific PIA implementations. Fundamentally any device that is secure, can identify a person or entity with a high degree of certainty, and can connect to the DPC via some form of communication line can serve as a PIA.

In some embodiments, specifically the home use and public use instances, the PIA hardware identification code is not used to identify either the payor or the payee.

Communication Lines

Communications between the PIA and the DPC occur via many different communication methods. Most depend on the particular communication networks already deployed by the organization or retailer that deploys the transaction authorization system.

Figure 2:
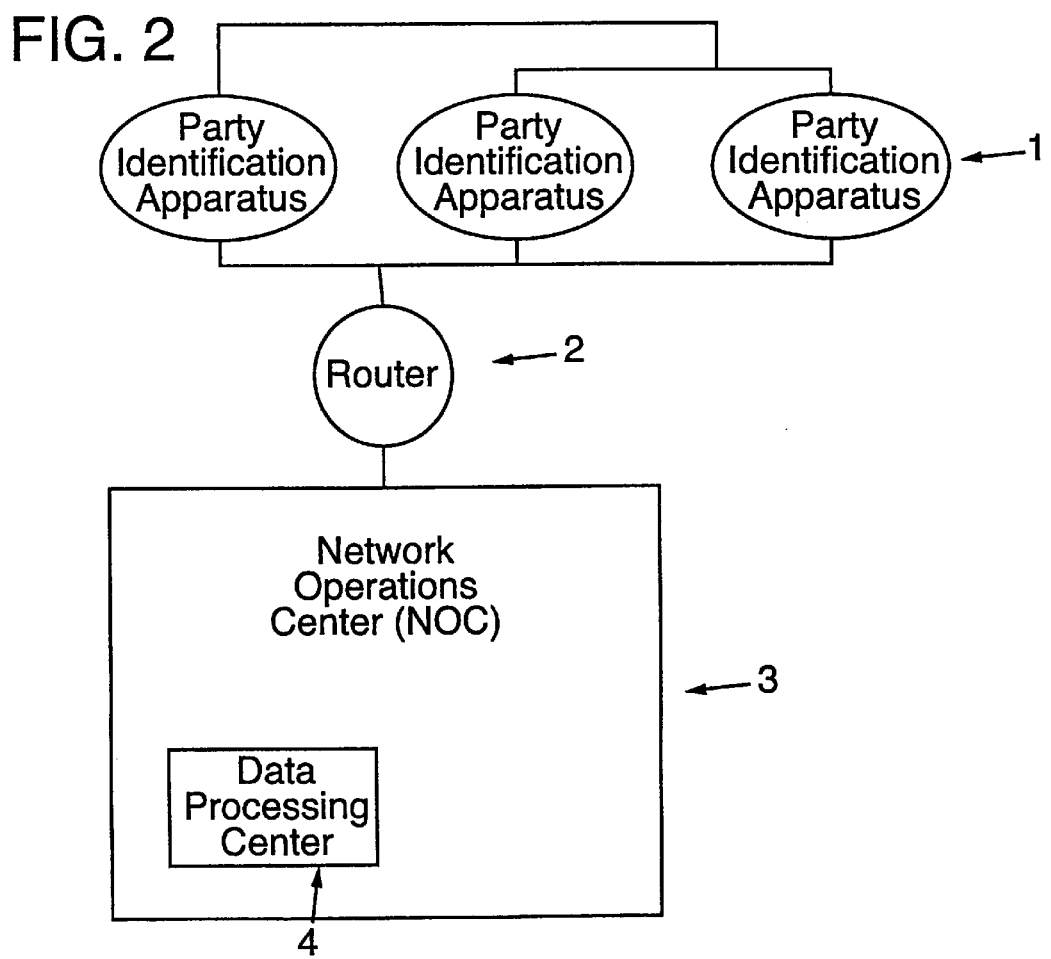
FIG. 2 shows the connection between the PIAs to a local router and a network operations center.

In an embodiment shown in FIG. 2, the PIAs 1 are connected via Ethernet to a local router 2, which is itself connected to a network operations center (NOC) 3 via frame relay lines. At least one DPC 4 is located at the NOC. Messages are sent from PIA to the DPC using TCP/IP over this network.

Figure 3:
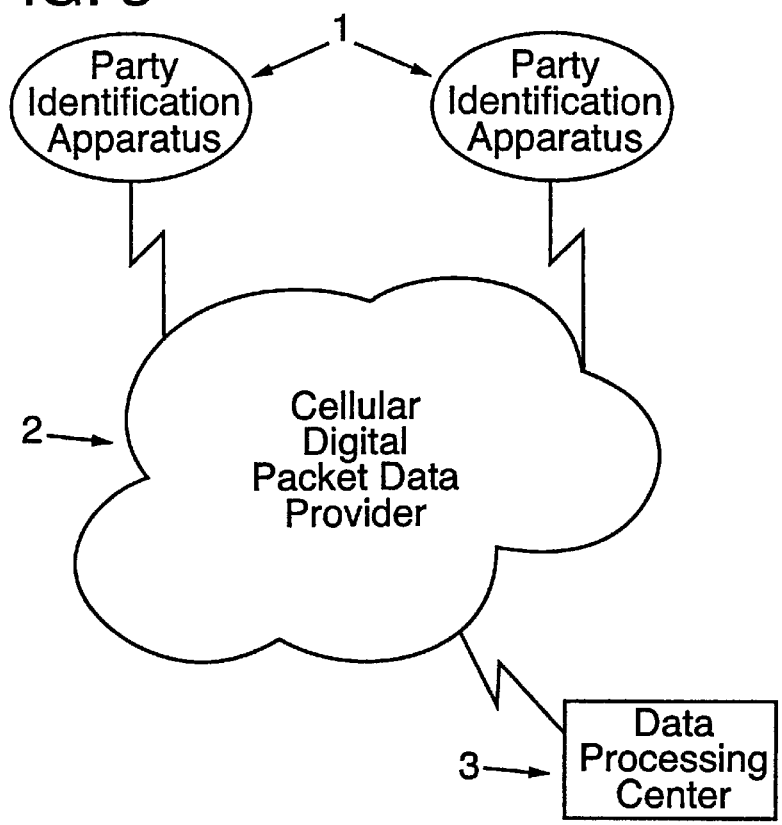
FIG. 3 shows an embodiment where the PIAs are connected to the DPC using, a cellular digital packet data.

In another embodiment shown in FIG. 3, the PIAs 1 are connected via a cellular digital packet data (CDPD) modem to a CDPD provider 2, who provides TCP/IP connectivity from the PIA to an intranet to which at least one DPC 3 is attached.

In yet another embodiment, a PIA is connected via the Internet, as is at least one DPC. TCP/IP is used to transmit messages from PIA to DPC. There are many different ways to connect PIA to DPC that are well understood in the art.

Data Processing Center

Data Processing Centers (DPC) serve to identify the payor and the payee in a transaction, retrieve credit/debit and financial account information for identified parties, and perform the execution that will result in settlement of transactions and funds delivery for the electronic payment.

Figure 4:
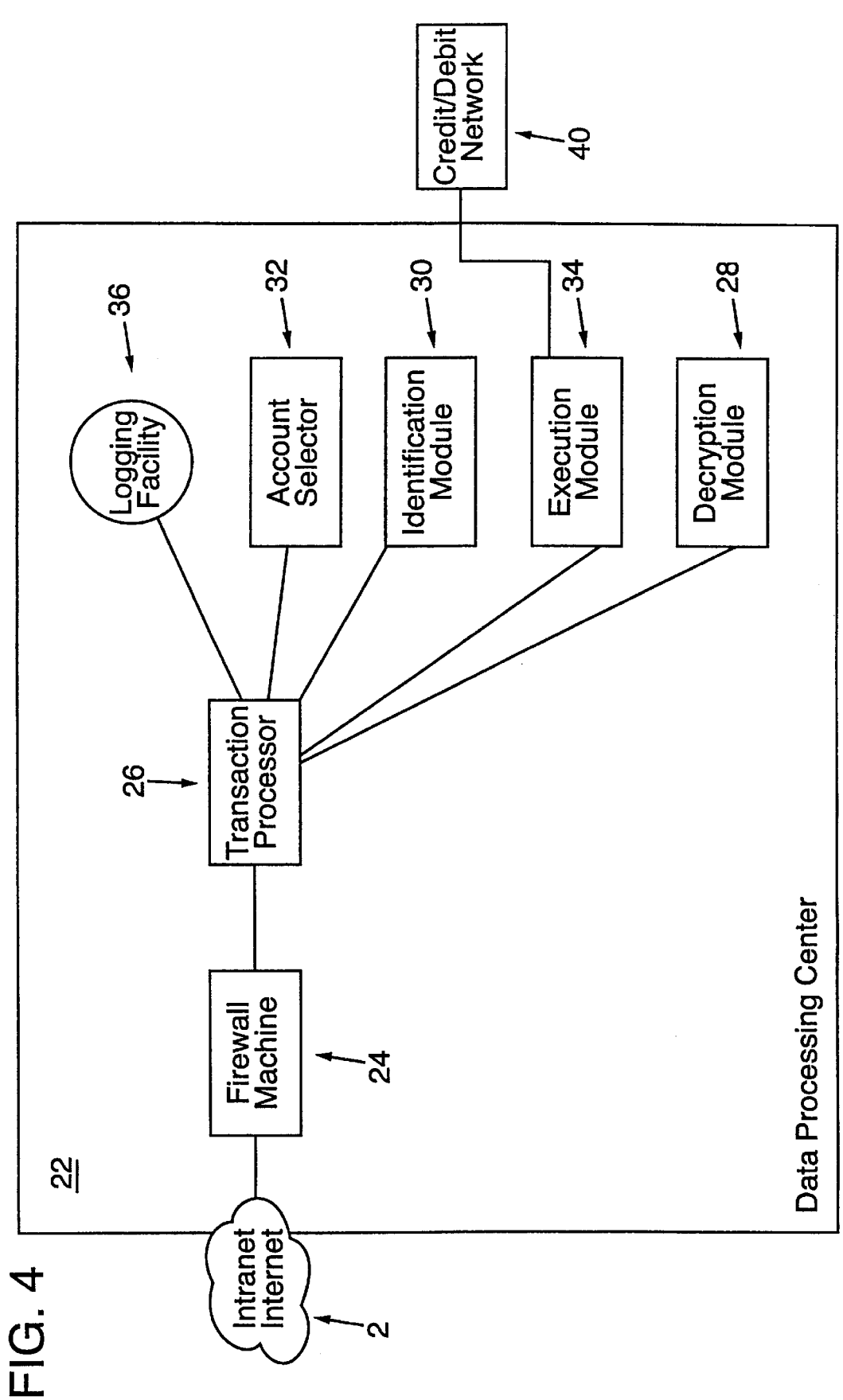
FIG. 4 is a preferred embodiment of the Data Processing Center (DPC) showing the connections between its components.

As seen in FIG. 4, the DPC 22 is connected to the Internet or intranet 2 using a firewall machine 24 that filters out all messages that are not from legitimate PIA devices. Messages are then sent to a transaction processor (TP) 26, which is responsible for overseeing the steps required to process the entire transaction.

In a preferred embodiment, the messages are decrypted. For this, the transaction processor uses the decryption module (DM) 28, which utilizes the hardware identification code of the PIA to identify the encryption codes that is required to decrypt the message from the PIA.

Once decrypted, the identity of both parties to the transaction is determined using the identification module (IM), or comparator engine 30. Once identified, the TP 26 determines the financial accounts each party will use using the account selector (AS) 32. This requires a DPC message back to the originating PIA if either the payor or payee have several financial accounts to choose from for completion of the electronic payment.

Once the financial account of each party for the transaction is selected, the electronic payment is executed using the execution module (EM) 34. For credit transactions, the EM obtains an authorization from the credit network, drawing down against the credit limit of the account but not resulting in a transfer of funds until settlement occurs. For debit transactions, the EM transmits a debit instruction to a debit network, resulting in an immediate debit from the payor's debit account. In either case, if insufficient resources are present in the payor's account, the transaction is denied. Each transaction (successful or not) is logged in the logging facility (LF) 36.

In a preferred embodiment, more than one DPC provides fault tolerance from either natural or man-made disasters. In this embodiment, each DPC uses a backup power generator, redundant hardware, mirrored databases, and other standard fault tolerant equipment known in the industry.

Decryption Module (DM)

In a preferred embodiment, all messages the DPC receives, with the exception of those not constructed by a PIA, contain a PIA hardware identification code, a sequence number, and a Message Authentication Code (MAC). (Message authentication codes, also known as cryptographic checksums, well known in the transaction industry, are used to assure that any changes to the content of the message will be detectable by the entity receiving the transmission.). The DM validates the message's MAC and then checks the sequence number for that particular PIA. If the DM determines that both the MAC and the sequence number are valid, the DM uses the unique secret key for that particular PIA to decrypt the message. For the decryption to function properly, the DM must contain a copy of each PIA's DUKPT key table.

If the decryption operation fails, or if the MAC check fails, the message is considered an invalid message. The TP logs a warning to the LF, terminates processing for the message, and returns an error message to the originating PIA.

Each message TP 26 receives preferably contains a response key stored in the encrypted section of the message. Before the TP replies to a message that includes a response key, it instructs the DM to encrypt the response message with that response key. The DM also generates a MAC for the response and appends it to the message.

Preferably, error messages are not encrypted although the DM does include a MAC for message authentication. Such messages never include confidential information. However, most response messages include a status or response codes that can indicate whether the request succeeded or not. For example, when the EM declines a transaction for financial reasons, it does not return an error message, it returns a normal transaction response message with a response code set to "failed".

Identification Module (IM)

Party identification occurs in different ways, depending on the identification information that is provided by the PIA. The identification module has subsystems for each type of information that is provided, and each subsystem is highly optimized to provide rapid identification as outlined below.

In one embodiment, the ID module detects payors or payees that re-register with the system by conducting a re-registration check. Given a particular registration biometric sample submitted by a person attempting to register with the system, the ID module determines if that person has ever been registered previously by comparing the registration biometric sample with other biometric samples previously registered. If a match occurs, the registration is rejected.

In a preferred embodiment, identification module 30 comprises subsystems that can identify parties from the following information:

biometric data and PIN
 biometric data alone
 digital identification (digital certificates)
 PIA hardware identification code Biometric-PIN Identification Subsystem (BPID)

In a preferred embodiment, the BPID subsystem comprises at least two BPID processors, each of which is capable of identifying parties from their biometric and PIN codes.

Preferably, the database of parties identifiable from biometric-PIN combinations is distributed equally across all BPID processors. Each processor is then responsible for a subset of identifications.

Figure 5:
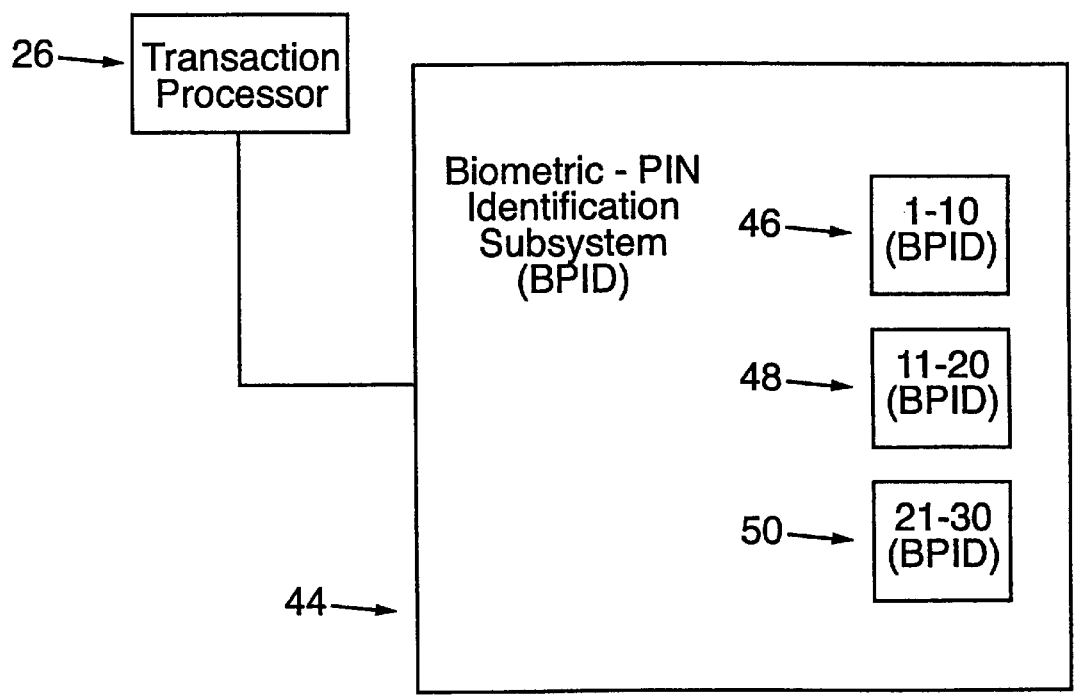
FIG. 5 shows a method by which the transaction processor determines a Biometric-PIN from the Biometric-PIN Identification subsystem is responsible of the biometric database.

In FIG. 5, TP 26 determines which Biometric-PIN from the BPID subsystem 44 is responsible for a given subdivision of the biometric database. In one embodiment, one BPID 46 is responsible for identifying people with PINs 1–10, another BPID 48 is responsible for identifying PINs 11–20, and a third BPID 50 is responsible for identifying PINs 21–30. For example, all messages from the PIA containing a PIN that equals the number 30 would be routed to BPID 50 for identification of the payor.

Once a BPID processor receives a bid biometric sample and PIN for identification, the processor searches through its database, retrieving all registered biometric samples that match or correspond to that particular bid PIN. Once all corresponding registered biometric samples are retrieved, the processor compares the bid biometric from the message to all retrieved registered biometric samples. If a match is found, the processor transmits the identity of the party back to TP 26. If no match is found, the processor transmits a "party not identified" message back to TP 26.

Biometric Identification Subsystem (BID)

In another embodiment, the BID subsystem comprises at least two BID processors, each of which is capable of identifying parties only from their biometric sample.

In one embodiment, each BID processor contains the entire database of biometrics. To distribute the transactions evenly across processors without undue effort, the TP determines randomly which BID processor will be used for a given electronic payment, and delegates the identification request to that BID processor. That BID processor then performs a search of its biometric sample database in order to find a matching registered biometric sample.

In one embodiment, other information is present that assists the BID processor in searching the database. For finger images, this includes information such as the classification of the image (whirl, arch, etc.), and other information about the finger ridge structure that is useful for selecting out biometrics that are not likely to match (or information on biometrics that are likely to match). Various methods of classification for rapid search of particular biometric databases are known in the art for example with regard to facial imaging and iris recognition.

Biometric comparisons are often more accurate if multiple biometrics are used. In some embodiments, multiple biometrics are used to more rapidly and more accurately identify individuals.

Digital Identification Subsystem

In a preferred embodiment, the digital identification subsystem comprises multiple processors, each of which is capable of identifying a payee from their digital certificates. In this embodiment, digital certificates are used to perform digital identification of the payee. Preferably this includes corporate web site addresses and certifying authorities only. Where possible, people provide biometrics as a means of identification, while computers provide digital certificates.

A digital certificate uniquely identifies a party. The major difficulty is verifying that a particular digital certificate is valid. This requires a public key from the certifying authority that issued that particular digital certificate. This requires that the digital identification subsystem have a list of certifying authorities and the public keys used to validate the digital certificates they issue. This table must be secure, and the keys stored therein must be kept up to date. These processes and others relating to the actual process for validating digital certificates are well understood in the industry.

PIA Hardware Identification Subsystem (PHI)

In a preferred embodiment, PIA hardware identification codes are translated into payee identification by the PHI subsystem. This subsystem maintains a list of all PIAs ever manufactured. Preferably, when a particular payee purchases a PIA, that payee's identity is linked to that PIA. Any transactions that originate from that PIA is assumed to be destined for the party that purchased the PIA.

In one embodiment, there are many financial accounts linked to a particular payee, while there is only one financial account linked to transactions issuing from a particular PIA. In another embodiment, the PIA hardware identification code does not serve to identify either the payee or the payor. This is the case in PIAs purchased for public terminals, Automated Teller Machines, or for home use.

Account Selector Subsystem (AS)

The AS process varies depending on the party being identified. Where the payor has registered only one credit/debit account number, that account number is automatically selected by the AS for debiting of funds.

In the cases where a payor has registered several credit/debit accounts, the AS processor retrieves a list of all designated credit/debit accounts, and transmits them back to the PIA for selection by the payor.

Some corporate entities will have several accounts attached to their identity; one account per point of sale location, one account per region, etc. For these cases, the AS processor invokes a specific selection rule for that particular entity, based on information in an electronic payment message.

In one embodiment, particular PIAs have account selection information associated with them. PIAs assigned to one particular store designate one financial account for deposit of funds, while PIAs assigned to another store designate another financial account for deposit of funds. However, both transactions are associated with the same payee.

In another embodiment, a payor or payee identifying themselves through biometrics has the option to pre-select the account from which the electronic payment will take place, using an account index code. The account index code is optionally an alphanumeric, or a series of numbers and codes that act as an easy-to-remember short-hand for the account number itself. These account index codes are correlated to particular credit/debit accounts during registration.

Execution Module (EM)

In a preferred embodiment, the execution module 34 generates a message to either the credit or debit network depending on the type of the credit/debit account selected by the payor.

For credit accounts, the EM transmits the payor credit account number, the transaction amount, and the payee transaction data to the credit network. This information is forwarded to the issuer, who then either approves or denies the credit transaction.

If the issuer approves the credit transaction, it returns an authorization to the execution module, and restricts the credit limit of the payor's account by the amount of the authorization. The TP then transmits the credit authorization number back to the to the PIA, which stores the authorization prior to settlement. At the end of the day, or whenever the payee demands, the PIA transmits all stored authorizations to the credit network acquiring processor for settlement, whereupon the payor's account is debited, and the payee's account is credited.

In another embodiment, the issuer is also the payee, such as is the case with a payor using a Macy's credit account to purchase merchandise at a Macy's store. In this embodiment, the issuer approves the transaction and decreases available credit, but settlement is not required.

For debit accounts, the EM transmits the payor debit account number, the transaction amount, and the payee transaction data to an on-line debit network. This information is forwarded to the issuing bank of the payor, where the transaction is either approved or denied.

If the issuing bank approves the debit transaction, it returns a transaction number to the EM, and immediately debits the payor's debit account. The transaction number is returned to the PIA, which lists the transaction on a daily debit transaction summary. The payee need take no further action since debit transactions are automatically settled, at which point the payee's financial account is credited.

Each transaction (successful or not) is logged in the logging facility (LF) 36.

Logging Facility

In a preferred embodiment, the logging facility (LF) 36 logs all electronic payment attempts to write-once media, so that a record is kept of each transaction and each error that has occurred during the operation of the tokenless authorization system.

Use-Sensitive DPC Configuration

While each DPC has some or all of the above features, in some embodiments the system has use-sensitive data processing capabilities, wherein multiple DPCs exist, some of which store a subset of the total number of registered parties.

This system comprises at least one master DPC, which contains a large subset of all parties registered with the system. The system further comprises at least two local DPCs that are physically apart from each other. Each local DPC contains a subset of the parties contained within the master DPC. Data communications lines allow messages to flow between each local DPC and the master DPC.

In this embodiment, identification request messages are first sent to the local DPC for processing. If a party cannot be identified by the local DPC, the message is forwarded to the master DPC. If the parties are identified properly by the master DPC, the message is processed appropriately. In addition, one or both party's identity information is transmitted from the master DPC to the local DPC, so that the next time parties will be successfully identified by the local DPC.

In another embodiment of a use-sensitive DPC system, the system further comprises a purge engine for deleting a party's identification information from the local DPC databases. In order to store only records for those parties who use the system more than a prescribed frequency and prevent the overload of databases with records from parties who use the system only occasionally, the record of a party is deleted from the local DPC databases if there has been no attempt to identify the party upon expiration of a predetermined time limit.

In order to make communications between the master DPC and the local DPCs secure, the system further comprises encryption and decryption means, wherein communications between the master DPC and local DPC are encrypted.

Registration

Parties that wish to either originate or receive electronic payments must first register with the tokenless authorization system. The identification and financial information registered with the system for a given party depends on the mode used to originate or receive payment. A payor must register at least one biometric or a biometric-PIN. Corporate entities must register at least one digital certificate, or must register their PIA hardware identification codes. All parties must also register the appropriate financial account information for crediting and debiting by the ACH.

To register, a payor submits a registration biometric sample obtained from their physical person by the PIA's biometric sensor. The PIA determines that the biometric scan is non-fraudulent, and then translates and compresses that biometric scan into a format suitable for rapid transmission to the DPC. The payor then enters a PIN code into the PIA keypad.

Next, the person associates at least one credit/debit account number with the registration biometric sample in the system. Preferably, this is accomplished by scanning a magnetic stripe card provided by the person through the magnetic stripe card reader attached to the PIA.

Preferably, an attendant verifies that the person actually owns the credit/debit account by comparing personal photo id (a driver's license, passport, id card, etc) to the name listed on the credit/debit card.

Once the attendant verifies the registration data and payor's identity, the PIA transmits the registration data to the DPC. The DPC then inserts the biometric (or biometric-PIN) into the appropriate identification database, updates the account selector, and enables the person to originate electronic payments.

In one embodiment, the DPC validates the credit/debit account data submitted during registration. This involves making certain that the credit/debit account being registered is a valid account. An entity may either register at least one digital certificate, or use at least one PIA hardware identification code to identify itself to the DPC. Digital certificates are available from certifying authorities, and they provide the assurance that the entity with the certificate is the authentic owner of that identity. These certificates contain readable text and other information that describes the entity. This can include a corporate logo, the address, as well as the company name.

This digital certificate is then linked to at least one financial account. This financial account is used to deposit all electronic payments originated by the payor to the payee when the digital certificate is used to identify the receiving party.

In an embodiment, the financial account of the entity is included in the digital certificate. This is not a preferred embodiment, as the disclosure of the financial account is potentially injurious to the entity.

PIA hardware identification codes are unique numbers assigned to PIA devices at the time of manufacture. If a company wishes all transactions issuing from a given PIA to flow to a particular corporate account, the company registers any such PIAs with the DPC, which updates the PIA device records to reflect the ownership of the PLAs.

Preferably, the security surrounding the registration of entity digital certificates or PIA hardware identification codes to financial account numbers is extremely strong, as this is a potential source for large losses over a short period of time.

Transactions

Transactions optionally occur at a retail point of sale, across the network from a well-known network merchant, or at home or public terminal from one person to another.

Retail Point of Sale Transactions

Figure 6:
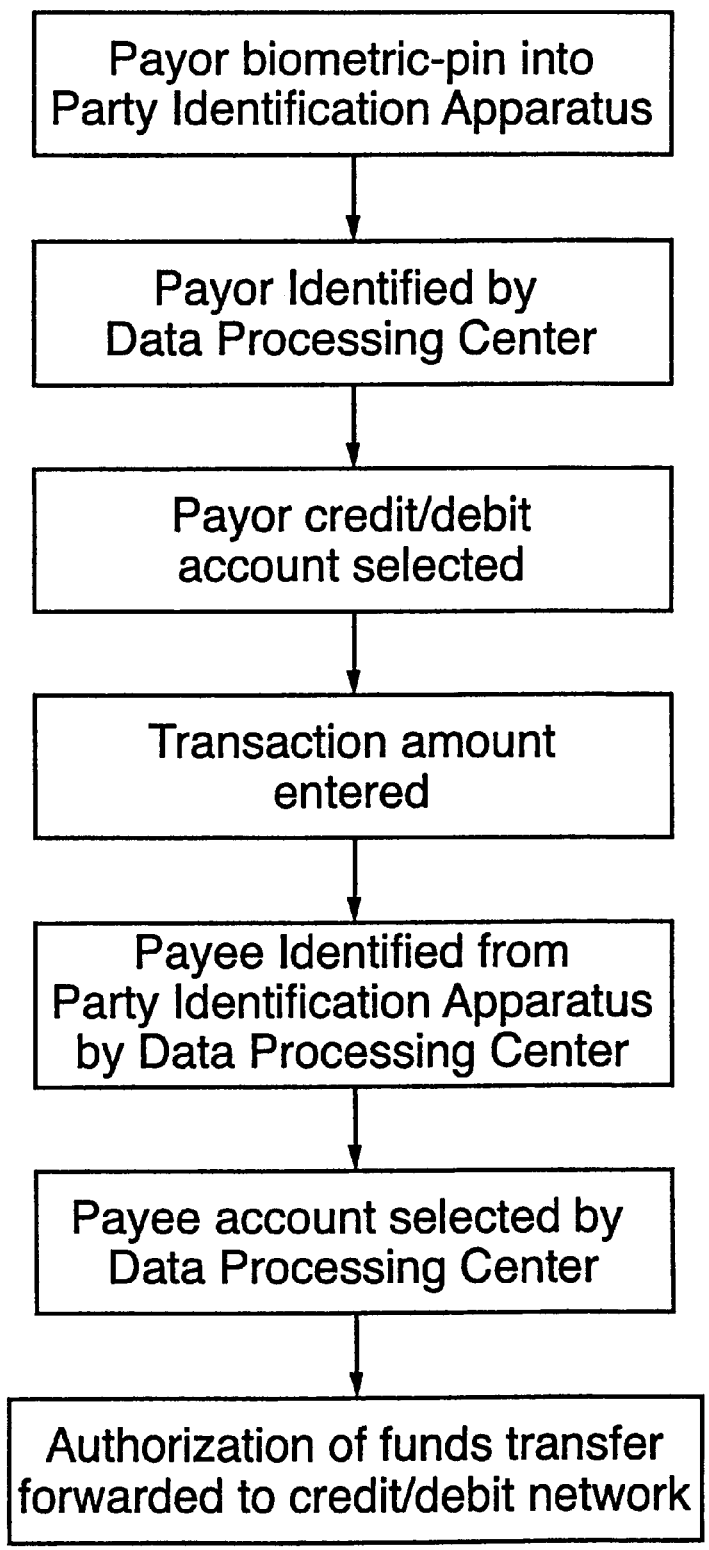
FIG. 6 shows the overall preferred flow chart where a biometric sample and PIN are used by the tokenless system to authorize an ACH transaction.
Figure 7:
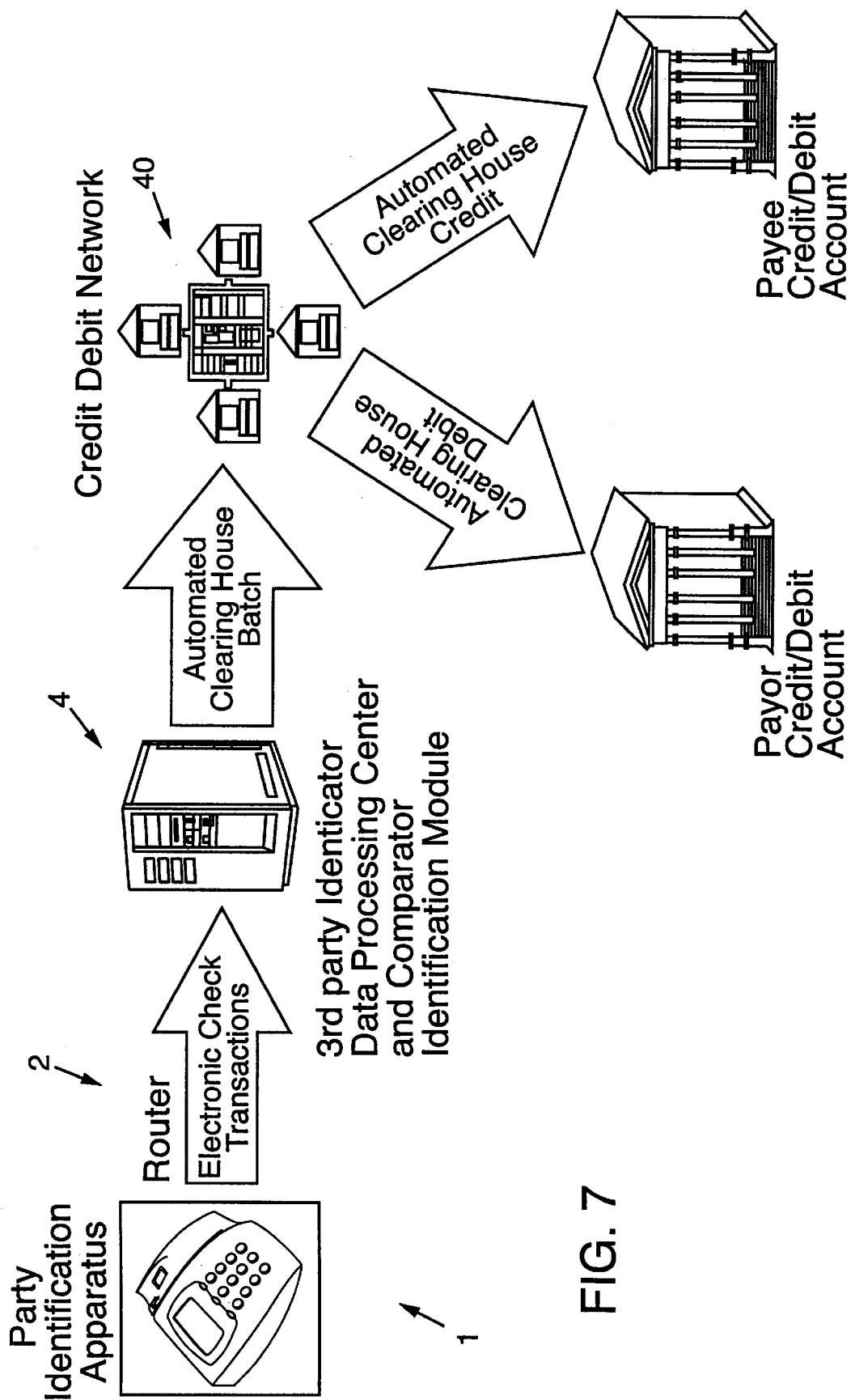
FIG. 7 is a diagram of the shows the overall preferred embodiment of the tokenless system to authorize an ACH transaction.

Retail point of sale transactions as shown in FIGS. 6 and 7 are characterized by identifying the payor using their biometric sample or biometric sample-PIN on a PIA controlled by payee. The payor is thus identified through biometrics, while the payee is identified through the PIA's hardware identification code.

In a preferred embodiment, a party at the point of sale originates an electronic payment in the following manner. First, the payor submits a bid biometric sample obtained from their physical person by the PIA's biometric sensor. The PIA determines that the biometric sample is non-fraudulent, and then translates and compresses that biometric sample into a format suitable for rapid transmission to the DPC.

Next, the payor enters a PIN code into the PIA keypad. At this point, the PIA transmits the biometric-PIN to the DPC for identification, along with the PIA hardware identification code. The DPC identifies the payor using the biometric sample, and retrieves the list of credit/debit accounts that the payor has previously registered with the system, and transmits this list back to the PIA. The DPC identifies the payee's financial account using the PIA hardware identification code that was previously registered by the payee.

The PIA displays the list of credit/debit accounts to the payor, who then selects one of the credit/debit accounts from which the funds will be drawn. In the event that only one credit/debit account was registered, that account will be automatically selected by the tokenless authorization system.

The transaction amount is then entered into the PIA, either using an electronic cash register or manually, by the payee. The payor then either approves or cancels the transaction using the PIA's keypad. Once the electronic payment is approved, the PIA transmits the electronic payment to the DPC, where the DPC authorizes the transaction and transmits a transaction to the appropriate credit or debit network for the transaction amount.

Execution by the DPC may result in a declined transaction due to lack of funds or other problem condition reported by the credit/debit network. If the transaction is declined, the DPC transmits the decline notification back to the PIA, and the payor may either cancel the transaction, or provide another account from which to originate payment.

In another embodiment, instead of the DPC transmitting the list of possible credit/debit accounts back to the PIA for payor selection, the payor instead indicates which account to select by entering an account index code or letter. This code is selected by the payor during account registration and linked to a particular credit/debit account of the payor.

Network Point of Sale Transactions

Network point of sale transactions are characterized by identifying the payor t using the payor's bid biometric sample submitted through the payor's personal PIA, or through a public PIA attached to an ATM or other public terminal. The payee is a registered network merchant, and is identified through a digital certificate. Thus the payor is identified through biometrics, while the payee is identified through the verification of a digital certificate issued by an authorized certifying authority.

In a preferred embodiment, the payor first locates the payee by locating the seller's place of business on the network: the web site, using the network address of the payee. The payor downloads the payee's digital certificate to the PIA that the payor is using. The PIA verifies that the digital certificate provided by the payee is a valid certificate.

The payor then submits a bid biometric sample obtained from their physical person using the PIA's biometric sensor. The PIA determines that the biometric scan is non-fraudulent, and then translates and compresses that biometric scan into a format suitable for rapid transmission to the DPC. The payor then enters a PIN code into the PIA keypad.

The PIA transmits the biometric-PIN to the DPC for identification, along with the payee's digital certificate. The DPC identifies the payor, and retrieves the list of credit/debit accounts that the payor has previously registered with the system, and transmits this list back to the PIA.

Both parties identify the financial accounts to be involved in the transaction. The payee must do this in an automated manner. In a preferred embodiment, this occurs at the DPC using account selection information included in the transaction by the payee. The payor optionally chooses from among a list of credit/debit accounts, or the payor may have only one credit/debit account from which payment may be made, in which case the payor's account is selected automatically.

The amount of the transaction is also transmitted to the PIA by the payee. The payor then either approves or cancels the transaction using the PIA's keypad. Once the transaction is approved, the PIA transmits the electronic payment to the DPC, where the DPC authorizes the electronic payment and transmits a new electronic payment transaction to the appropriate credit or debit network for authorization or execution.

Execution by the DPC may result in a declined transaction due to lack of funds in the account, a closed account, or some other immediately detectable problem condition. If the transaction is declined, the DPC transmits the decline notification back to the PIA, and the payor may either cancel the transaction, or select another account from which to originate payment if another account exists.

In one embodiment, a private code, which is distinct from a personal identification number (PIN) and not used in a payor identification step, and is preferably chosen by the user, is transmitted to the PIA from the DPC, and presented to either the payor or payee subsequent to a successful identification using biometrics. This private code identifies the authorization system to the payor or payee users. The private code is selected by the payor or payee during registration with the third party identicator, and is never entered into the PIA during a transaction authorization. Additionally, the PIA and DPC always transmit the private code in an encrypted form. As a result, only the authentic DPC and PIA can provide a person's private code after a successful identification. The private code is displayed to the payor to validate that the authentic electronic third party identicator has processes the transaction.

The authorization system alternatively further comprises a tokenless authorization system that communicates with one or more external computers during the payor resource determination step and the transaction payment step.

The transaction amount includes data that is necessary for conducting a transaction such as price information, a list of goods and services, a payee name, a date or time, a location, or an invoice number.

The transaction acceptance step optionally further comprises the payor entering a new transaction amount, which is the sum of a cash back amount and the transaction amount, for the financial transaction.

Preferably, in a payor re-registration step, the user's registration biometric samples are compared against previously designated biometric samples wherein if a match occurs, the computer system is alerted to the fact that the payor has re-registered with the tokenless authorization system.

Also preferably, in a biometric theft resolution step, where the payor uses a Biometric-PIN identification subsystem, the payor's personal identification number is changed whenever the payor's biometric sample is determined to have been fraudulently duplicated.

Optionally, during the payor registration step, the payor registers at least one payor debit/credit account and assigns an account index code to each payor credit/debit account, and during the acceptance step the user adds the account index code to the financial transaction, wherein the account index code further comprises one or more alphanumeric characters.

In one embodiment, the PIA is actually built-in and/or integrated with a personal computer. These personal computer PIA hardware identification codes are not used to identify either party in a transaction.

In another embodiment, the payor can be a representative of a business entity that has permission to access the business entity's credit/debit accounts to purchase items on the network.

In yet another embodiment, settlement of payment is delayed for an agreed-upon time period, to enable implementation of net-30 payment terms and the like.

In one embodiment, a network transaction is deposited into an escrow account at an Internet merchant, instead of into the merchant's actual account as a direct payment for goods received.

From the foregoing, it will be appreciated how the objectives and features of the invention are met. First, the invention provides an electronic payment computer system that eliminates the need for a payor to possess and present any personalized man-made tokens, in order to authorize a transaction.

Second, the invention provides an electronic payment computer system that is capable of verifying a payor's unique personal identity, as opposed to verifying possession of personalized objects and information.

Third, the invention verifies the payor's identity based upon one or more unique characteristics physically personal to the user.

Fourth, the invention provides a cost-effective electronic payment system that is practical, convenient, and easy use.

Fifth, the invention provides a system of secured access to a computer system that is highly resistant to fraudulent transaction authorization attempts by unauthorized users.

Although the invention has been described with respect to a particular tokenless authorization system and method for its use, it will be appreciated that various modifications of the apparatus and method are possible without departing from the invention, which is defined by the claims set forth below.

What is claimed is:

1. A method for tokenless authorization of an electronic payment between a payor and a payee using an electronic third party identicator and at least one payor bid biometric sample, said method comprising the steps of:

a. a payor registration step, wherein the payor registers with an electronic third party identicator at least one registration biometric sample, and at least one payor financial account;

b. a payee registration step, wherein the payee registers a payee identification data with the electronic third party identicator;

c. a transaction formation step, wherein an electronic financial transaction is formed between the payor and the payee, comprising payee bid identification data, a transaction amount, and at least one payor bid biometric sample, wherein the bid biometric sample is obtained from the payor's person;

d. at least one transmission step, wherein the payee bid identification data, the transaction amount, and payor bid biometric sample are electronically forwarded to the third party electronic identicator;

e. a payor identification step, wherein the electronic third party identicator compares the bid biometric sample with at least one registered biometric sample for producing either a successful or failed identification of the payor;

f. a payee identification step, wherein the electronic third party identicator compares the payee's bid identification data with a payee's registered identification data for producing either a successful or failed identification of the payee;

g. wherein upon successful identification of the payor and payee, a biometric-based authorization of an electronic payment is authorized without the payor presenting any personalized man-made tokens to transfer funds from the payor's financial account to the payee's financial account.

2. The method of claim 1 wherein the payee identification data comprises any one of the following; a payee hardware ID code, a payee telephone number, a payee email address, a payee digital certificate code, a payee account index, a payee financial account number, a payee biometric, and a payee biometric and PIN combination.

3. The method of claim 1 wherein the payee registration step further comprises registering a payee biometric sample with the electronic third party identicator, which is compared in the payee identification step with at least one registered biometric sample for identification of the payee.

4. The method of claim 1 wherein the payor registration step further comprises registering a payor personal identification number with the electronic third party identicator, which is used by the tokenless authorization system to identification the payor.

5. The method of claim 1 further comprising a payor resource determination step, wherein it is determined if the payor's financial account has sufficient resources to be debited for the transaction amount.

6. The method of claim 1 further comprising a payor account selection step, wherein after the payor has been successfully identified in the payor identification step, the tokenless authorization system presents at least one financial account which was registered by the payor with the tokenless authorization system for selection of one of the financial accounts by the payor for debiting.

7. The method of claim 1 further comprising a transaction payment step, wherein the transaction amount is debited from a payor's financial account.

8. The method of claim 7, wherein the transaction amount is credited to the payee's financial account.

9. The method of claim 1 wherein the registration step further comprises registering a payor private code with the electronic third party identicator, which is distinct from a personal identification number and not used in the payor identification step, wherein the private code is displayed to the payor to validate that the authentic electronic third party identicator has processes the transaction.

10. The method of claim 5 wherein both the payor resource determination step and the electronic payment step further comprise the tokenless authorization system communicating with one or more external computers.

11. The method of claim 1 wherein the transaction amount comprises price information, a list of goods and services, a payee name, a date or time, a location, or an invoice number.

12. The method of claim 1 wherein the transaction acceptance step further comprises the payor entering a new transaction amount, which is the sum of a cash back amount and the transaction amount, for the financial transaction.

13. The method of claim 8 wherein the transaction payment step further comprises the payor designating a future date on which the transaction amount is to be deducted from the payor's financial account and credited to the payee's financial account.

14. The method of claim 1 further comprising a payor re-registration step, wherein the user's registration biometric samples are compared against previously designated biometric samples wherein if a match occurs, the computer system is alerted to the fact that the payor has re-registered with the tokenless authorization system.

15. The method of claim 1 wherein the biometric sample comprises of one of the following: a fingerprint, a facial scan, a retinal image, an iris scan, and a voice print.

16. The method of claim 4 further comprising a biometric theft resolution step, wherein the payor's personal identification number is changed whenever the payor's biometric sample is determined to have been fraudulently duplicated.

17. The method of claim 1 wherein during the payor registration step, the payor registers at least one payor credit/debit account and assigns an account index code to each payor financial account, and during the acceptance step the user adds the account index code to the financial transaction, wherein the account index code further comprises one or more alphanumeric characters.

18. A method according to claim 1 in which the payor's financial account is selected from a group which includes a credit/debit account and a checking account.

19. A tokenless electronic payment authorization system for transferring funds from a payor credit/debit account to a payee financial account, said system comprising:
  a. a computer data processing center further comprising data bases wherein the payor registers a registration biometric sample and the payee registers a payee identification data;
  b. a party identification apparatus having a biometric sensor for input of a biometric sample;
  c. communication lines for transmission of a registration and bid biometric sample obtained by the party identification apparatus from the payor's person to the data processing center;
  d. a comparator engine for comparing a bid biometric sample to at least one registration biometric sample, and comparing a bid payee identification data with at least one registration payee identification data; and
an execution module for authorizing transfer of a transaction amount from the payor credit/debit account to the payee financial account upon successful identification of the payor, wherein no man made memory devices, comprising the group of credit/debit cards, smart cards, and paper checks, is used by the payor to conduct the financial transaction.

20. The authorization system of claim 19 wherein the payee identification data comprises any one of the following; a payee hardware ID code, a payee telephone number, a payee email address, a payee digital certificate code, a payee account index, a payee financial account number, a payee biometric, and a payee biometric and PIN combination.

21. The authorization system of claim 19 wherein the payor registration biometric sample is associated with a PIN, the PIN used by the authorization system for identification the payor.

22. The authorization system of claim 19 wherein the execution module determines if the payor's credit/debit account has sufficient resources to be debited for the transaction amount.

23. The authorization system of claim 19 further comprising an account selector module, wherein after the payor has been successfully identified, the authorization system presents at least one credit/debit account which was registered by the payor with the authorization system for selection of one of the credit/debit accounts by the payor for debiting.

24. The authorization system of claim 19 wherein the execution module debits the transaction amount from a payor's credit/debit account.

25. The authorization system of claim 24, wherein the execution module credits the transaction amount to the payee's financial account.

26. The authorization system of claim 19 further comprising a transaction processors wherein the payor registers a private code with the authorization device, which is distinct from a personal identification number and not used to identify the payor, wherein the private code is displayed to the payor to validate that the authentic authorization system has processed the financial transaction.

27. The authorization system of claim 19 wherein a subset of the payor registration biometric samples are stored in a payor re-registration database, which the comparator engine compares a payor's registration biometric samples to, wherein if a match occurs, the authorization system is alerted to the fact that the payor has re-registered with the tokenless authorization system.

28. A tokenless electronic payment authorization system for transferring funds from a payor credit/debit account to a payee financial account, said system comprising:
  a. at least one computer data processing center further comprising data bases wherein the payor registers a registration biometric sample and the payee registers a payee identification data;
  b. a party identification apparatus having a biometric sensor for input of a biometric sample;
  c. communication lines for transmission of a registration and bid biometric sample obtained by the party identification apparatus from the payor's person to the data processing center;
  d. a comparator engine for comparing a bid biometric sample to at least one registration biometric sample, and comparing a bid payee identification data with at least one registration payee identification data;
  e. an account selector module, wherein after the payor has been successfully identified, the authorization system presents at least one credit/debit account which was registered by the payor with the authorization system for selection of one of the credit/debit accounts by the payor for debiting, and f. an execution module for authorizing transfer of a transaction amount from the payor selected credit/debit account to the payee financial account, wherein no man made memory devices, comprising the group of credit/debit cards, smart cards, and paper checks, is used by the payor to conduct the financial transaction.

* * * * *

UNITED STATES PATENT AND TRADEMARK OFFICE
CERTIFICATE OF CORRECTION

PATENT NO. : 6,269,348 B1
DATED : July 31, 2001
INVENTOR(S) : Pare, Jr., et al.

It is certified that error appears in the above-identified patent and that said Letters Patent is hereby corrected as shown below:

Column 7,
Line 12, "using, a" should read -- using a --.
Line 18, "responsible of" should read -- responsible for a given subdivision of --.
Line 27, "careless" should read -- cardless --.
Line 28, "using, credit" should read -- using credit --.

Column 11,
Line 22, after "PIA hardware identification code" insert -- The payee identification data comprises any one of the following; a payee hardware ID code, payee telephone number, a payee email address, a payee digital certificate code, a payee account index, a payee financial account number, a payee biometric, and a payee biometric and PIN combination.
       The payee registration step further comprises registering a payee biometric sample with the electronic third party identicator, which is compared in the payee indentification step with at least one registered biometric sample for identification of the payee. The payor registration step further comprises registering a payor personal identification number with the electronic third party identicator, which is used by the tokenless authorization system to identify the payor. --

Column 15,
Line 10, "PLAs" should read -- PIAs --.

Signed and Sealed this

Twenty-first Day of January, 2003

JAMES E. ROGAN
*Director of the United States Patent and Trademark Office*